United States Patent

Starrett

[15] 3,701,851

[45] Oct. 31, 1972

[54] SWITCHING VOICE AND DATA COMMUNICATIONS SIMULTANEOUSLY OVER A COMMON PATH

[72] Inventor: William Roswell Starrett, Lincroft, N.J.

[73] Assignee: Bell Telephone Laboratories, Incorporated, Murray Hill, N.J.

[22] Filed: Dec. 9, 1970

[21] Appl. No.: 96,313

[52] U.S. Cl. .......179/15 BY, 179/15 FD, 179/16 EC

[51] Int. Cl. ............................................H04j 1/14

[58] Field of Search..179/15 FD, 15 R, 15 BY, 16 A, 179/16 E, 16 EA, 16 EC, 2 DP

[56] References Cited

UNITED STATES PATENTS

| | | | |
|---|---|---|---|
| 3,261,922 | 7/1966 | Edson | 179/15 BY |
| 3,349,191 | 10/1967 | Mann | 179/16 A |
| 2,677,726 | 5/1954 | Entz | 179/15 FD |

*Primary Examiner*—Kathleen H. Claffy
*Assistant Examiner*—David L. Stewart
*Attorney*—R. J. Guenther and James Warren Falk

[57] ABSTRACT

An integrated voice-and-data communication system is disclosed wherein voice-and-data channels are frequency multiplexed and switched through a wideband switching network on a common four-wire path. When the switching connection is being established, coupler-and-detector circuits couple the voice channel, demultiplexed to baseband, to the network so that network control signals in the voice channel can be employed to establish the connection. The control signals, however, are isolated by the coupler-and-detector circuits from the outgoing data channel. When the switching connection has been established, the coupler-and-detector circuits disconnect the baseband voice channel and connect frequency multiplexed voice and data signals to the common four-wire path through the network.

11 Claims, 6 Drawing Figures

INVENTOR
W. R. STARRETT
BY Howard R Popper
ATTORNEY

SWITCHING VOICE AND DATA COMMUNICATIONS SIMULTANEOUSLY OVER A COMMON PATH

FIELD OF THE INVENTION

This invention relates to integrated data and telephone voice communication systems and more particularly to communication systems in which multiplexed voice-and-data signals are transmitted through switching offices and over four-wire transmission media, such as coaxial cable or radio-relay-carrier systems.

BACKGROUND OF THE INVENTION

In prior art voice-and-data communication systems associated with four-wire switching networks, either voice or data signals may be transmitted over a four-wire connection between two voice/data telephone subsets, with one pair of wires carrying the signals in one direction and the other pair of wires carrying the signals in the opposite direction. A problem exists in making sure that the voice/data telephone subsets at either end of the four-wire connection are both in the voice mode or both in the data mode and in coordinating the transfer from mode to mode at both subsets at the same time. In one prior art system transfer from voice to data communications or vice versa is done manually at both the originating and terminating voice/data telephone subsets upon mutual agreement of the calling and called parties. Under such an arrangement, a conventional procedure is to initiate a connection with the calling set in the voice mode by dialing the called voice/data telephone substation in the usual manner and, after the connection has been completed and the party at the called substation has answered, to request the called party to transfer his set to the data mode. Once both sets are in the data mode, however, there may be some problem in making a request for the called party to transfer back to the voice connection.

To solve the problem of transfer between voice-and-data modes, another prior-art system places control of transfer between voice-and-data communication under control of the party at the originating end of the connection. Past practice has also included an arrangement wherein the voice termination apparatus at the voice/data telephone subsets is normally connected to the four-wire communication channel. In response to an incoming automatic data call, determined by signals received upon automatic answering of the call indicative of an automatic data call, the channel connection is transferred to the data termination apparatus. The problem also exists in this system for transferring back to voice connection.

A partial solution to the foregoing problem was conveniently available when the calling and called data set could be connected over a fixed path, i.e., one not requiring switching through any intervening telephone offices. Under these circumstances, transmission equipment could be used between the calling and called data sets which multiplexed the voice and data channels for transmission over coaxial cable or radio relay equipment so that a voice path and a data path would exist simultaneously. However, if the connection had to be switched through an intervening telephone office, it would be necessary to demultiplex the voice channel to baseband in order to extract supervision and call signaling information. In addition, it would be necessary to demultiplex the data signal to baseband since the outgoing connection from one office to the next might require transmission in a different frequency band than that over which the signals arrived at the office. With both the voice channel and the data channel demultiplexed to baseband at the intermediate switching office, however, an eight-wire path had to be provided through that office's switching network because the baseband data signals contain frequencies lying within the baseband of voice frequency signals.

It is, therefore, an object of this invention to permit the simultaneous transmission of voice and data signals over a single four-wire path through an intermediate switching office connecting calling and called voice data telephone sets.

In one widely used carrier system carrying combined voice-and-data signals, the data signal from a voice/data subset is assigned to a channel in the 60–104 kHz band and the voice signal is assigned to a channel in the 104–108 kHz band. These signals are frequency multiplexed and in turn used to modulate one of many higher frequency carriers of the coaxial cable or radio-relay-carrier equipment for transmission to the next switching office. In order to switch the voice-and-data signals through this office, however, the signals must be demodulated from the radio frequency carrier to the combined 60–108 kHz band and then demultiplexed and demodulated to baseband to extract switching information from the voice channel. Thereafter, if necessary, the voice-and-data signals would have to be remultiplexed to the 60–108 kHz band and used to modulate another radio frequency carrier for further transmission.

It is well known in the art that each modulation or demodulation step that a signal undergoes introduces signal distortion due to the nonlinear characteristics of vacuum tubes and transistors, and that this distortion is cumulative with each subsequent modulation or demodulation step the signal undergoes. While distorted digital signals may be corrected using digital techniques, the degradation of analog audio signals is not so easily corrected, and, therefore, the number of intermediate switching offices at which demodulation and remodulation takes place, should be kept to a minimum. It is, therefore, a further object of this invention to reduce distortion to the voice signal of a combined voice data channel by reducing the number of times the voice signal is demodulated and used to remodulate at intermediate switching offices.

SUMMARY OF THE INVENTION

I have discovered that simultaneous transmission of voice-and-data signals over the same four-wire path through a switching network in an intermediate switching office can be accomplished if the voice channel is first demodulated to baseband in order that network control signals can first be extracted and used to set up the single four-wire connection through the network and, then, after the connection is established, the voice channel is shifted from baseband to a higher frequency band while the data channel is connected to the common network path at baseband.

In one illustrative embodiment of my invention, I provide detector-and-coupler circuits at each four-wire intermediate switching office through which the voice/data communication path between calling and called voice-data sets passes. When a connection is in the process of being established through an intermediate switching office, the voice channel is first demultiplexed and demodulated from the radio frequency carrier to a channel in the 104–108 kHz band and this is then demultiplexed and demodulated to baseband to be applied to a signal-frequency signaling (SF) unit so that single-frequency supervisory signaling in the voice channel may be employed to initiate a request for service to the switching network of the office. Thereafter, my detector-and-coupler circuits couple the baseband voice channel output to the switching network so that multifrequency network call signaling information in the voice channel can be employed by the switching network to establish a connection to an appropriate outgoing trunk. When the cross office connection is established and the multifrequency signaling information is outpulsed, my detector-and-coupler circuits provide a baseband voice frequency path over which call progress signals such as "busy" or "ringing" can be heard by the calling party. While the connections are being established my detector-and-coupler circuits isolate the multifrequency network control signals to the incoming SF unit from the outgoing data channel.

The detector-and-coupler circuits next detect the subsequent completion of the four-wire connection between the calling and the called stations. Responsive to this condition, the detector-and-coupler circuits disconnect the SF units from the path through the network and, instead, connect the demultiplexed, but undemodulated 104–108 kHz voice channel to the four-wire path that has been established through the network. Simultaneously, the detector-and-coupler circuits couple the baseband data channel to the four-wire path through the network. Accordingly, once the connection has been established, both voice and data signals are carried through the network of the intermediate switching office over the same four-wire path, the voice channel being transmitted in the 104–108 kHz band and the data channel occupying the 1–37 kHz baseband. Thus, I have eliminated the need for a second four-wire switching path through the office. In addition, I have saved one demodulating and remodulating step to the voice signal. This reduces distortion to the voice signal.

DESCRIPTION OF THE DRAWING

The above and other objects and features of the present invention will become more apparent upon consideration of the following d description in conjunction with the drawing, in which.

Figure 2:
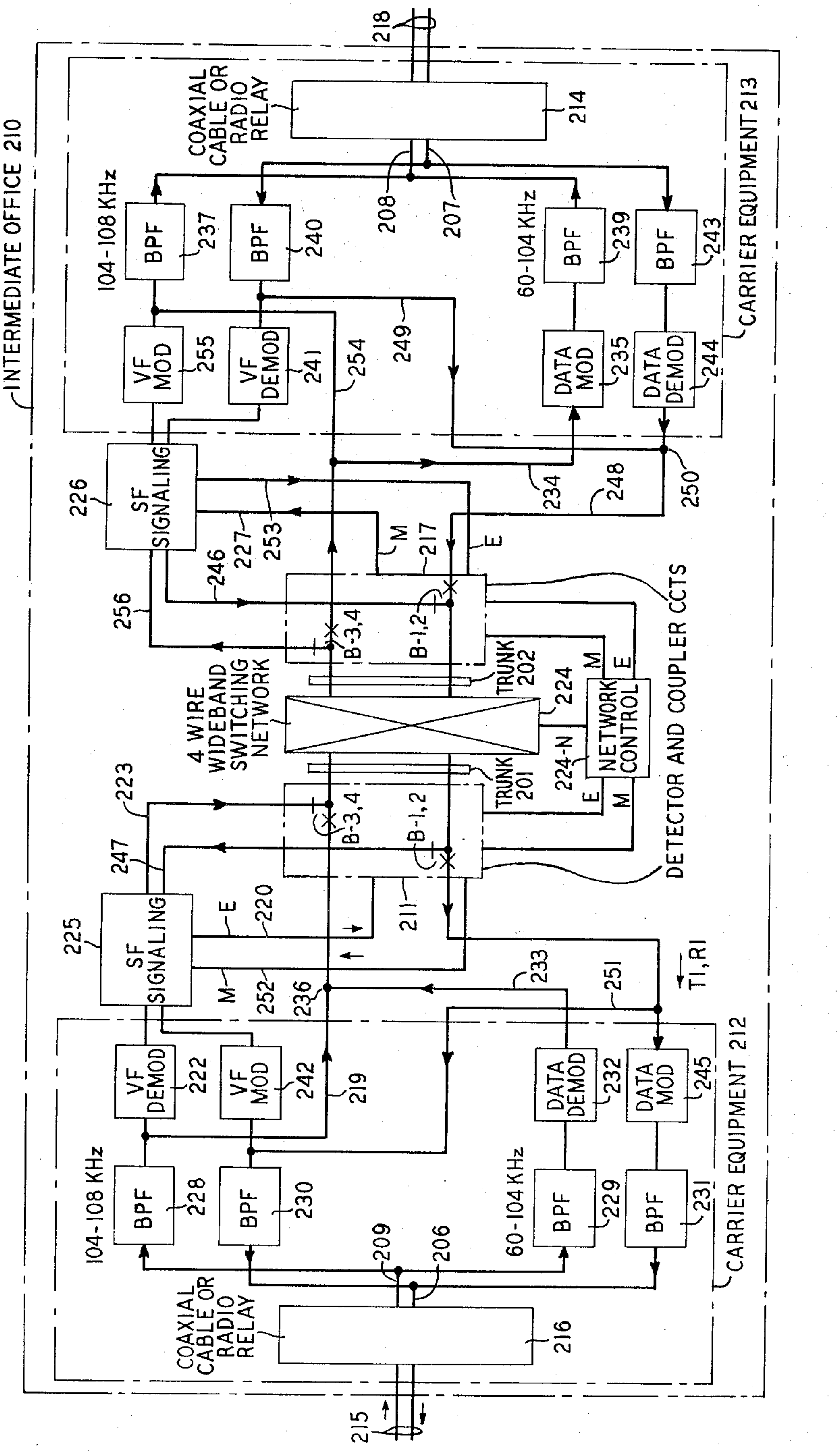
FIG. 2 is a block diagram of a four-wire intermediate switching office which is equipped with the detector-and-coupler circuits of my invention.
Figure 4:
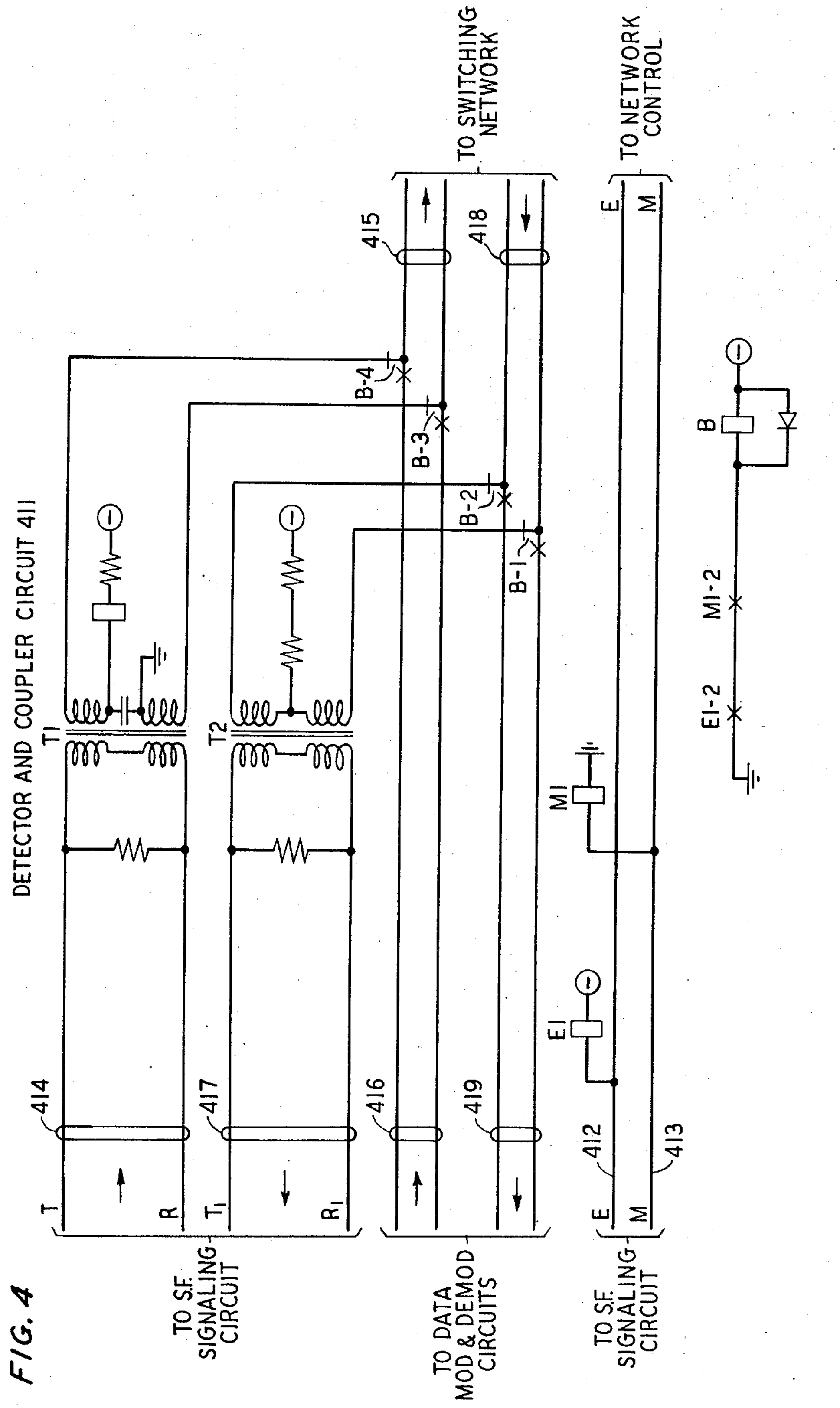
FIG. 4 shows the details of one of the detector-and-coupler circuits of FIG. 2.

It will be noted that FIGS. 2 and 4 employ a type of notation referred to as "detached contact" in which an "X" represents a normally open contact of a relay, and a bar, shown intersecting a conductor at right angles, represents a normally closed contact of a relay; "normally" referring to the unoperated condition of the relay. The principles of this type of notation are described in an article by F. T. Myer in the publication of the *American Institute of Electrical Engineers, Transactions, Communications and Electronics* entitled "An Improved Detached-Contact-Type Schematic Circuit Drawing," Volume 74, pages 505–513.

The present invention may advantageously be embodied in an automatic switching system, such as disclosed in J. W. Gooderham U.S. Pat. No. 2,868,884, dated Jan. 13, 1959. It is to be understood, however, that our invention is not limited to use in a system of this type but may be used in any four-wire switching system.

The interrelation and function of equipment units of this illustrative embodiment of my invention will now be described with reference to FIGS. 1 through 4, wherein the interconnections between circuit blocks have been designated by means of arrows to show the direction of circuit action.

GENERAL DESCRIPTION

Before the detailed operation of the invention is discussed, the operation of the switching office in setting up a communication path between calling and called stations will be described.

Figures 1, 6:
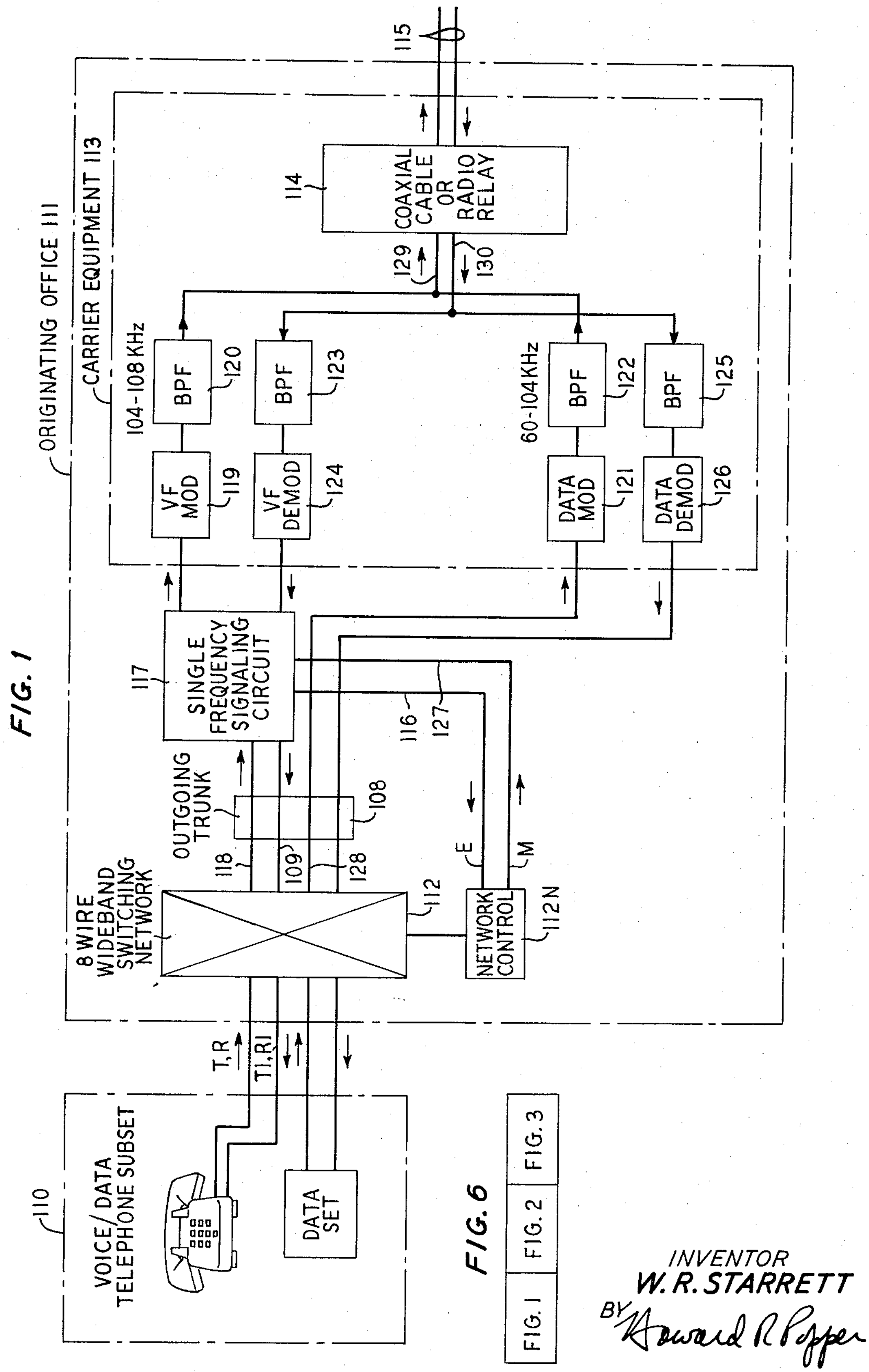
FIGS. 1 and 3 are block diagrams of originating and terminating switching offices and voice/data subsets for handling voice -and-data communications transmitted and received over coaxial cable or radio-relay-carrier equipment.
FIG. 6 shows the manner in which the other figures should be arranged.

Let it be assumed that voice/data set 110, FIG. 1, initiates a call. The call signaling information, in the form of dial pulsing or multifrequency pushbutton tones transmitted by voice/data set 110 is received by originating office 111 and office 111, recognizing that voice/data set 110 is entitled to wideband data service, selects an appropriate outgoing trunk 108. As a signal that trunk 108 has been seized, single-frequency signaling circuit 117 associated with trunk 108 interrupts the 2,600 Hz supervisory signal that SF unit 117 normally transmits towards intermediate office 210, FIG. 2. The interrupted 2,600 Hz signal from SF unit 117 is placed into the 104–108 kHz band voice channel by carrier equipment 113. Next, coaxial cable or radio-relay equipment 114 places the voice channel into a higher frequency band for transmission to intermediate office 210 in FIG. 2. An example of a single-frequency signaling circuit utilizing inband single-frequency signaling that can be used with this invention, is disclosed in u.s. Pat. No. 2,642,500 to W. W. Fritschi et al. of June 16, 1953 and also described in the article by A. Weaver and N. A. Newell published in the *Bell System Technical Journal*, "Inband Single Frequency Signaling," Vol. 33, 1954.

Coaxial cable or radio-relay equipment 216 at intermediate office 210, FIG. 2, demodulates the voice channel in the higher frequency band to the 104–108 kHz band. Bandpass filter 228 selects the voice channel and voice frequency demodulator 222 demodulates the voice channel to baseband. SF unit 225 receives the baseband voice channel which now contains the interrupted 2600 Hz control signal, and derives the dc signals necessary to inform network control 224N that trunk 201 has been seized for use by calling office 111. Responsive thereto, network control 224N transmits a dc control signal (through detector-and-coupler circuit 211, in a manner hereinafter to be described in detail) to SF unit 225 as an indication that intermediate office 210 is ready to receive multifrequency or dial pulse call signaling information.

SF unit 225, which normally transmits a 2,600 Hz signal towards originating office 111, momentarily interrupts the signal. The momentarily interrupted 2,600 Hz signal from SF unit 225 is placed by voice frequency modulator 242 and bandpass filter 230 into a voice channel in the 104–108 kHz band. Coaxial cable or radio-relay equipment 216, in turn, places this voice channel into a higher radio frequency band for transmission to originating office 111, FIG. 1.

In FIG. 1, coaxial cable or radio-relay equipment 114 demodulates the radio frequency carrier to the 104–108 kHz band and the voice channel is then selected by bandpass filter 123, demodulated to baseband by voice frequency demodulator 124 and applied to SF unit 117. SF unit 117 converts the momentarily interrupted 2,600 Hz signal contained in the voice channel to dc signals which are applied to network control 112N. Responsive thereto, network control 112N causes multifrequency call signaling information to be outpulsed over trunk 108, through SF unit 117, voice frequency modulator 119, bandpass filter 120 and coaxial cable or radio-relay equipment 114, to intermediate office 210, FIG. 2.

Figure 5:
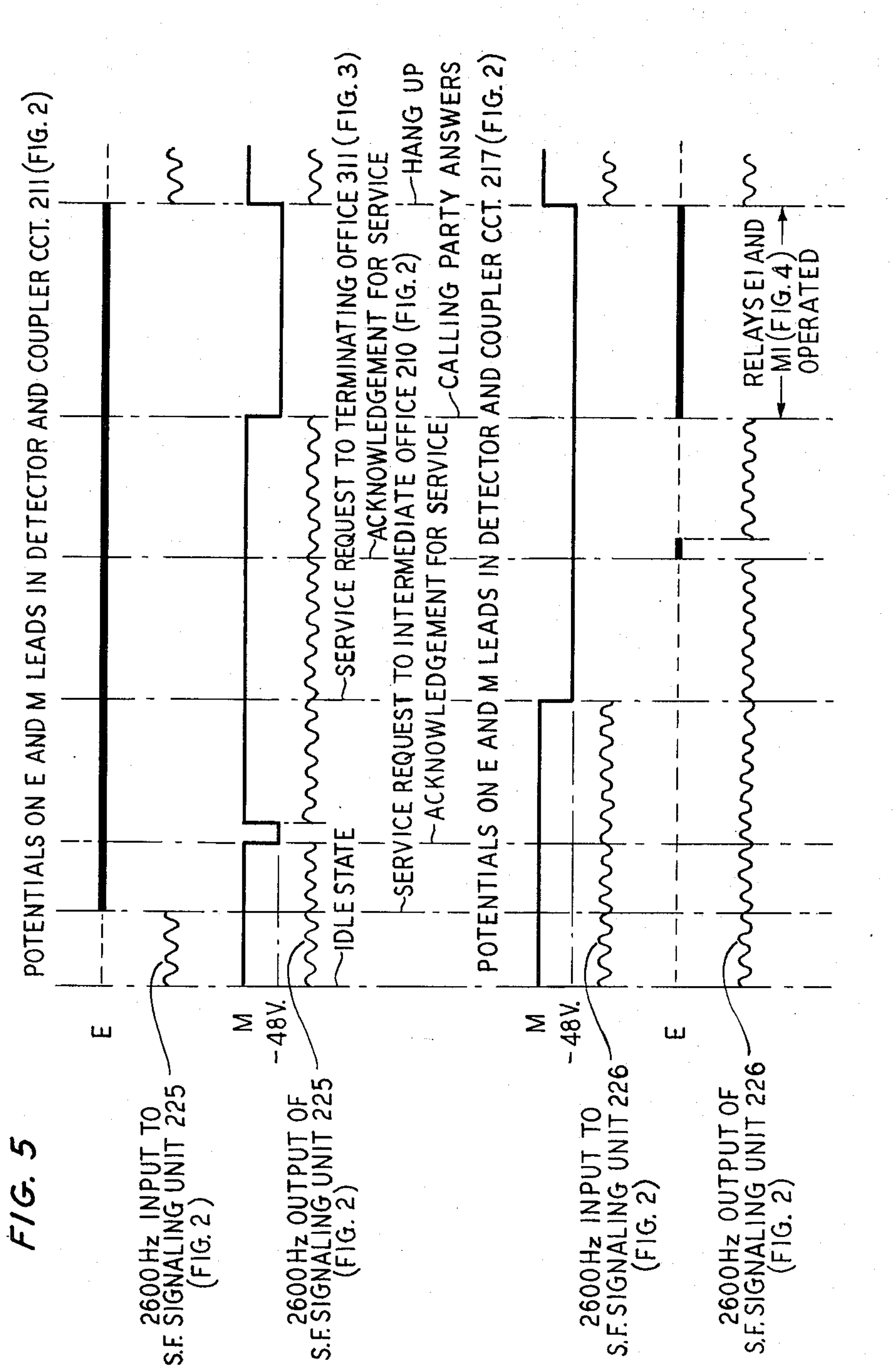
FIG. 5 is a waveform diagram showing the correlation between the 2,600 Hz supervisory signals transmitted between offices and the dc signals on the E and M-leads in the detector-and-coupler circuits of my invention.

Responsive to the receipt of the multifrequency call signaling information in the voice channel (as demodulated to baseband by coaxial cable or radio-relay equipment 216, bandpass filter 228 and voice frequency demodulator 222) network control 224N establishes a path through network 224 to an outgoing trunk 202 appropriate to the destination indicated by the call signaling information. Incident to the seizure of trunk 202 network control 224N transmits dc control signals (through detector-and-coupler circuit 217 as described hereinafter) to SF unit 226, associated with trunk 202, in similar manner that network control 112N transmitted dc control signals to SF unit 117 associated with trunk 108 of FIG. 1. In similar fashion also, SF unit 226 interrupts the 2,600 Hz signal normally transmitted toward office 311, FIG. 3, to inform office 311 that trunk 202 has been seized for use. Thereafter, operations ensue with respect to SF unit 226 and carrier equipment 213, FIG. 2, and carrier equipment 313 and SF unit 317, FIG. 3, that are the same as those operations just described with respect to SF unit 117 and carrier equipment 113, FIG. 1, and carrier equipment 212 and SF 225, FIG. 2. FIG. 5 shows the details of the interruptions of the 2,600 Hz supervisory signals and the signals placed on the E- and M-leads in response thereto.

Figure 3:
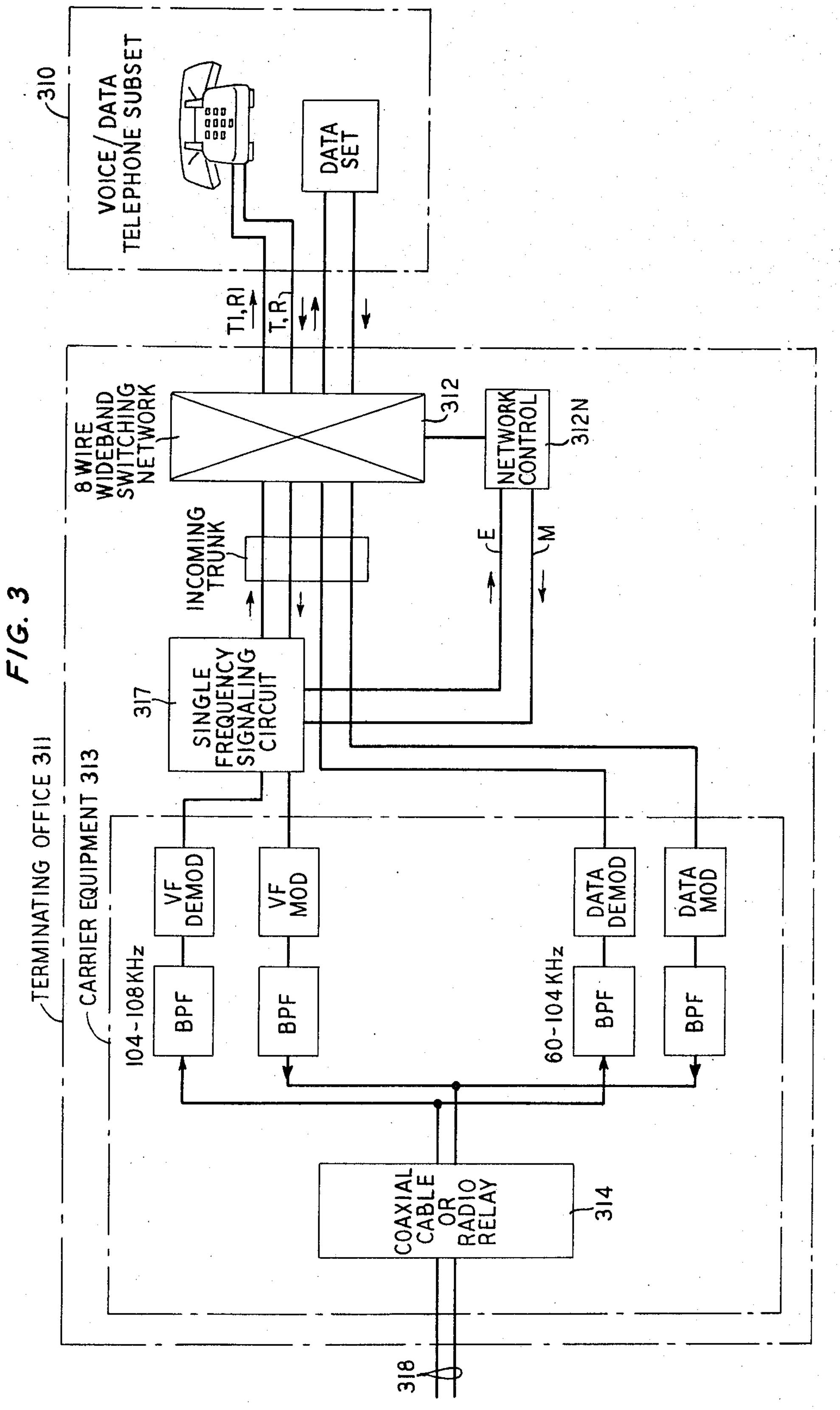

Office 311, FIG. 3, thereupon sets up a switching connection through network 312 to called voice/data telephone subset 310 identified by the multifrequency call signaling information forwarded by intermediate office 210.

Thus far, I have described the operation of my system assuming that coupler-and-detector circuits 211 and 217 were providing merely a conductive path for the dc signals required to be exchanged between SF units 225, 226 and network control 224N. Such direct paths existed in the prior art. In the prior art, after the complete connection between a calling data set 110, FIG. 1, and a called data set 310, FIG. 3, has been established (and the called party answered the call), data and voice signals could commence being transmitted. The voice signals are transmitted from voice/data set 110, through its respective four-wire path in network 112, and placed into the 104–108 kHz voiceband by modulator 119 and bandpass filter 120. The data signals are transmitted by the data set equipment of voice-data subset 110 through the respective four-wire path in switching network 112, and placed into the data channel in the 60–104 kHz band by data modulator 121 and bandpass filter 122. The voice-and-data signals, now in the combined band of 60–108 kHz, are used to modulate the same radio frequency carrier of coaxial cable or relay equipment 114 as was priorly used to transmit the voice-frequency-band multifrequency call signaling information. At intermediate office 210, FIG. 2, the radio frequency carrier is demodulated to the 60–108 kHz band by coaxial cable or radio-relay equipment 216 and the 60–104 kHz data channel is selected by bandpass filter 229 and demodulated to the baseband of 1–37 kHz by data demodulator 232. The 104–108 kHz voice channel is selected by bandpass filter 228. At this point in the prior art the voice channel would be demodulated to baseband and a separate four-wire path would have to be provided through network 224 inasmuch as the 1–37 kHz baseband of data frequencies overlaps the 60–3000 Hz baseband voice frequencies.

In accordance with my invention, however, through the use of detector-and-coupler circuits 211 and 217, the switching network of the intermediate office 210 need merely provide a single four-wire path which can be used for both voice and data signals. Briefly, detector-and-coupler circuits 211, 217 detect (in a manner hereinafter to be described in detail) when the connection from a calling to a called data set has been established and the called party has answered. Thereupon, detector-and-coupler circuits 211, 217 operate their respective B relays, whose contacts B-1, 2, 3, 4 only are shown in FIG. 2. When the B relays are operated, a connection is made to the junction between the respective bandpass filters and voice frequency modulators and demodulators of carrier equipments 212, 213 so that the voice signals will be connected through make contacts B-1, 2, 3, 4 in detector-and-coupler circuits 211, 217 to the single four-wire path through network 224 in the 104–108 kHz band rather than being completely demodulated to the 60–3,000 Hz baseband as in the prior art. The baseband voice channel through SF units 225, 226, priorly used to pass multifrequency call signaling information to network 224, is now opened at break contacts B-1, 2, 3, 4 in detector-and-coupler circuits 211, 217. Simultaneously, a connection is made to the inputs of the data modulators and the outputs of the data demodulators so that the data signals will be carried through the same four-wire path demodulated to the baseband of 1–37 kHz. Since the frequencies at which the data and voice signals will now be carried through the network do not overlap, the same four-wire path may be utilized. Thus, in accordance with my invention, intermediate office 210, through which voice-data signals are carried, need only provide a single four-wire path for two-way voice/data communication, and a step of modulation and demodulation with the voice channel is completely eliminated after the complete communication path is established. Details of the operation of my detector-and-coupler circuits will now be described.

DETAILED DESCRIPTION

Since the general relationship of the operation of the apparatus shown in FIGS. 1, 2 and 3 has heretofore been described, it is not deemed necessary to repeat the operations prior to the interruption of the 2,600 Hz signal received by SF unit 225 from voice frequency demodulator 222 incident to the seizure of trunk 201 by calling office 111, FIG. 1. The dc signals which SF units 225 and 226 exchange with network control 224N will, however, now be described in detail. These dc signals which also pass through detector-and-coupler circuits 211, 217 are shown in detail in FIG. 5 in relationship to the 2,600 Hz supervisory signals transmitted between offices.

Responsive to the removal of the 2,600 Hz tone at its input, SF unit 225 applies ground potential to E-lead 220 (lead 412 in FIG. 4). The ground potential applied to E-lead 220 of detector-and-coupler circuit 211 causes relay E1 to operate in detector-and-coupler circuit 211. Network control 224N recognizes the appearance of ground on E-lead 220 as a request for service and in the normal manner assigns a digit receiver (not shown) at the network 224 appearance of tip-and-ring conductors 223. When intermediate office 210 is ready to receive multifrequency call signaling information from originating office 111, network control 224N returns an acknowledgment by momentarily applying −48 volts to M-lead 252 (lead 413 in FIG. 4), causing SF unit 225 to momentarily interrupt the 2,600 Hz signal normally returned to originating office 111. The momentary application of −48 volts to M-lead 252 is insufficient to operate relay M1 in coupler-and-detector circuit 211. In response thereto originating office 111 forwards multifrequency call signaling information and an appropriate connection is established through network 224 to trunk 202 and SF unit 226.

Network control 224N then requests service of terminating office 311, FIG. 3, by changing the potential on M-lead 227 (lead 413 in FIG. 4) to SF unit 226 from ground potential to −48 volts. In response thereto relay M1 in detector-and-coupler circuit 217 is operated. The −48 volts applied to M-lead 227 causes SF unit 226 to interrupt the 2,600 Hz signal normally transmitted to terminating office 311, FIG. 3. When terminating office 311, FIG. 3, is ready to receive multifrequency call signaling information from intermediate office 210, the 2,600 Hz signal normally returned to intermediate office 210 is momentarily interrupted. This momentary interruption of the 2,600 Hz signal is detected by SF unit 226, FIG. 2, which, in response thereto, momentarily applies ground potential to E-lead 253 (lead 412 in FIG. 4). The momentary ground potential on E-lead 253 pulse is insufficient to operate relay E1 in detector-and-coupler circuit 217. In response to the momentary ground potential applied to E-lead 253, network control 224N causes multifrequency call signaling information to be forwarded to terminating office 311. When the desired connection has been established through terminating office 311, the 2,600 Hz signal normally received by SF signaling unit 226 from terminating office 311 is interrupted. SF unit 226 applies ground potential to E-lead 253 (lead 412 in FIG. 4) which now operates relay E1 in detector-and-coupler circuit 217. At this time both relays E1 and M1 in detector-and-coupler circuit 217 are operated which in turn operates its B relay (see FIG. 4). In response to the ground potential on E-lead 253, network control 224N changes the potential on M-lead 252 (lead 413 in FIG. 4) from ground potential to −48 volts, and relay M1 in coupler-and-detector circuit 211 is operated. At this time, both relays E1 and M1 in detector-and-coupler circuit 211 are operated which in turn operate its B relay (see FIG. 4). In response to the −48 volt potential now applied to M-lead 252, SF unit 225 interrupts the 2,600 Hz signal normally transmitted to originating office 111, FIG. 1.

The operation of the B relays in detector-and-coupler circuits 211 and 217 permits the multiplexed voice-and-data signals from both calling and called stations to be switched through network 224 over the single four-wire connection as priorly described.

Thus, detector-and-coupler circuits 211 and 217, in accordance with my invention, monitor the call supervision signals transmitted between offices to detect when the communication connection has been completed. Prior to completion of the connection between calling and called parties, the voice channel, demodulated to baseband, is connected to network 224 so that multifrequency call signaling information may be received and used to set up a single four-wire path through network 224 in the standard manner. After completion of the connection between calling and called parties, the baseband voice channel is removed from network 224 and a frequency multiplexed voice-and-data signal is connected to the single four-wire path through network 224. In this manner simultaneous transmission of voice-and-data signals occurs between calling and called voice/data sets without having to provide a second four-wire path through network 224.

After completion of the connection the SF signaling units continue to monitor the voice channel via the VF demodulators so that disconnect by either or both parties can be detected. This state is signaled by the reappearance of 2,600 Hz in one or both voice channels. The entire system then returns to the original idle condition.

It is apparent that various modifications may be made without departing from the spirit and scope of my invention. Thus, for example, the particular frequency bands into which voice-and-data signals are multiplexed for transmission over a common path through a switching network may obviously be different than those bands in the illustrative embodiment herein. Further, my invention may be employed in arrangements wherein the originating and terminating voice/data sets 110 and 310 are connected directly to carrier equipment without the utilization of the eight-wire wideband switching network. In such embodiments the voice conductors may be connected through a signaling converter to the single frequency signaling circuit, such as circuit 117 or 317, while the data conductors may be connected directly to the data modulator and demodulator, such as modulator 121 and demodulator 126. In such an embodiment the service request is received by the signaling converter associated with the signaling circuit 117 and the network control 224 attaches an appropriate digit receiver and returns dial tone to the originating set. Similarly at the called set the single frequency circuit 317 would appropriately generate a supervisory control signal which causes the called set to indicate, as by lights or a ringer, the presence of the call. The network control 224 would also provide an audible ringback signal to the calling party.

What is claimed is:

1. In an integrated voice-and-data communication system having a switching network and wherein frequency multiplexed voice-and-data signals are applied to a common transmission path between a calling and called voice/data set, the combination comprising, signaling circuit means operative during the the establishment of said path for detecting call signaling information in said signals and for connecting the voice frequency ones of said signals directly to said path, means for detecting the completion of said path to said called voice/data set responsive to said call signaling information, and means responsive to said detecting means for disconnecting said signaling circuit means from said common transmission path and connecting said frequency multiplexed voice-and-data signals to a common transmission path through said network.

2. In a telephone switching office having a switching network and including terminal means for receiving frequency multiplexed voice and data signals from remote stations, said terminal means normally demultiplexing and demodulating said signals to the baseband frequencies of the respective voice and data components of said voice and data signals for transmission through said switching network, the improvement comprising means operative at said office during the establishment of a switching connection from a calling to a called voice/data set for connecting demultiplexed and demodulated ones of said baseband voice signals carrying call signaling information through said network toward said called data set, means for detecting completion of a switching connection between said calling and called data sets, and means controlled by said detecting means for disconnecting said demultiplexed and demodulated baseband voice signals from said switching connection and connecting demultiplexed and demodulated ones of said data signals and demultiplexed ones of said voiceband signals through said switching network.

3. An integrated voice-and-data communication system having a switching network for establishing a transmission path between a first and a second telephone substation and including voice termination means and data termination means interposed in said path between each of said stations and said network for demultiplexing and demodulating voice and data band signals to establish said path through said network and to transmit multiplexed voice-and-data signals over said path through said network, comprising first means responsive to demodulated signals from said voice termination means for controlling the establishment of a single, two-way transmission path through said network, second means indicating completion of said two-way path between said substations, and means responsive to said second means for connecting frequency multiplexed signals from said voice termination means and said data termination means for transmission over said two-way path through said network.

4. The integrated voice-and-data communication system of claim 3 wherein said first means is responsive to demodulated call signaling from said voice termination means to connect received call signaling information to said network to control the establishment of said two-way path through said network.

5. The integrated voice-and-data communication system of claim 4 wherein said first means is normally connected to said transmission path but is disconnected by said second means.

6. An integrated voice-and-data communication system having a switching network for establishing a transmission path between a first and a second telephone substation and including voice termination means and data termination means interposed in said path between each of said stations and said network for demultiplexing and demodulating voice and data band signals to establish said path through said network and to transmit multiplexed voice-and-data signals over said path through said network comprising means activated by said voice termination means for connecting call signaling information at baseband to said network to control the establishment of said path therethrough, means for detecting the completion of said path between said substations, means for frequency multiplexing voice and data signals from said voice termination means and said data termination means for transmission through said network over said path, and means responsive to said detecting means for disconnecting said baseband call signaling information from said network upon the completion of said path and for connecting said multiplexed signals to said path through said network.

7. The integrated voice-and-data communication system of claim 6 wherein said voice termination means transmits said call signaling information in a voice channel.

8. The integrated voice-and-data communication system of claim 7 wherein voice and data signal outputs of said voice and said data termination means are multiplexed by said frequency multiplexing means with the data signals at baseband and the voice signals in a higher frequency band.

9. In an integrated voice-and-data communication system wherein voice, data, and signaling information are transmitted over the same transmission facilities, voice and data information being in different frequency bands and said signaling information being in the same frequency band with said voice information, the combination comprising voice-and-data information transmission means for demultiplexing and demodulating said voice, data, and signaling information transmitted over said transmission facilities, switching network means providing a common path for said voice-and-data information, signaling circuit means receiving demodulated signaling information from said voice-and-data information transmission means for controlling said network means, and detector-and-coupler circuit means for normally connecting said signaling information from said signaling means to said switching network means and for normally blocking voice-and-data information from said information transmission means from said network means, said detector-and-coupler circuit including means responsive to establishment of a communication path including said common path between a calling and a called voice/data telephone substation for disconnecting said signaling means from said network means and for connecting said voice-and-data information from said information transmission means to said common path.

10. In an integrated voice-and-data switching system, the combination in accordance with claim 9 wherein said signaling circuit means comprises single-frequency signaling means and said means responsive to establishment of a communication path includes means for detecting E- and M-signaling from said single-frequency signaling means.

11. In an integrated voice-and-data communication system wherein multiplexed voice, data, and signaling information are transmitted over the same transmission facilities, voice and data information being in different frequency bands and said signaling information being in the same frequency band with said voice information, wherein voice information transmission means and data information transmission means for demultiplexing and demodulating said voice, data, and signaling information are selectively connectable to an individual side of a switching network, and wherein a first signaling circuit for receiving the demodulated signaling information is connected to said voice information transmission means on one side of said network and a second signaling circuit for receiving the demodulated signaling information is connected to said voice information transmission means on the other side of said network, the improvement comprising a first detector-and-coupler circuit normally connecting said first signaling circuit to said network and normally blocking said voice and said data information transmission means from said one side of said network, and a second detector-and-coupler circuit normally connecting said second signaling circuit to said network and normally blocking said voice and said data information transmission means from said other side of said network, both said detector-and-coupler circuits including means responsive to signals from both said signaling circuits indicating completion of a transmission path through said network for disconnecting both said signaling circuits from said network and connecting frequency multiplexed voice-and-data information from said voice-and-data transmission means to said path through said network.

* * * * *